US012694192B1

(12) United States Patent

Lecerf et al.

(10) Patent No.: US 12,694,192 B1

(45) Date of Patent: Jul. 28, 2026

(54) USE OF AI IMAGE GENERATION MODEL TO CREATE HIGH-LEVEL VISUALIZATION OF A NETWORK-ON-CHIP

(71) Applicant: ARTERIS, INC., Campbell, CA (US)

(72) Inventors: Ugo Lecerf, Paris (FR); Donatello Conte, Paris (FR); Pierre-Henri Bonnaud, Sophia Antipolis (FR)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 19/314,187

(22) Filed: Aug. 29, 2025

(51) Int. Cl.
|  |  |
| --- | --- |
| *G06F 30/392* | (2020.01) |
| *G06F 30/27* | (2020.01) |
| *G06N 3/0499* | (2023.01) |
| *G06F 115/02* | (2020.01) |

(52) U.S. Cl.
CPC ............ *G06F 30/392* (2020.01); *G06F 30/27* (2020.01); *G06N 3/0499* (2023.01); *G06F 2115/02* (2020.01)

(58) Field of Classification Search
CPC .... G06F 30/392; G06F 30/27; G06F 2115/02; G06N 3/0499
See application file for complete search history.

(56) References Cited

U.S. PATENT DOCUMENTS

| | | | | |
| --- | --- | --- | --- | --- |
| 8,667,439 | B1 * | 3/2014 | Kumar ................ | G06F 30/3312 |
| | | | | 716/108 |
| 8,819,611 | B2 * | 8/2014 | Philip ..................... | G06F 13/40 |
| | | | | 716/124 |

| | | | | |
| --- | --- | --- | --- | --- |
| 9,792,397 | B1 * | 10/2017 | Nagaraja ................. | G06F 30/32 |
| 10,354,039 | B1 * | 7/2019 | Yu .......................... | G06F 30/398 |
| 10,635,774 | B2 * | 4/2020 | Gangwar ............... | G06N 3/126 |
| 10,666,578 | B2 * | 5/2020 | Venugopalan .......... | H04L 45/28 |
| 10,817,627 | B1 * | 10/2020 | Agarwal ................. | G06F 30/18 |
| 11,176,302 | B2 * | 11/2021 | Rao ....................... | G06F 30/392 |
| 11,310,169 | B2 * | 4/2022 | Prasad ................... | H04L 45/02 |
| 11,329,690 | B2 * | 5/2022 | Gade ...................... | H04L 41/12 |
| 12,237,980 | B2 * | 2/2025 | Cherif ................... | G06F 30/394 |
| 12,250,145 | B2 * | 3/2025 | Agarwal ................. | H04L 45/38 |
| 2015/0036536 | A1 * | 2/2015 | Kumar ............... | H04L 41/0826 |
| | | | | 370/254 |
| 2015/0178435 | A1 * | 6/2015 | Kumar .................. | G06F 30/394 |
| | | | | 716/114 |
| 2016/0149780 | A1 * | 5/2016 | Hsu .......................... | G06F 1/32 |
| | | | | 370/252 |
| 2016/0188779 | A1 * | 6/2016 | Probell ............... | G06F 30/3308 |
| | | | | 716/111 |
| 2017/0177778 | A1 * | 6/2017 | de Lescure ........... | G06F 30/392 |
| 2017/0230253 | A1 * | 8/2017 | Chopra ................. | H04L 41/145 |
| 2018/0183726 | A1 * | 6/2018 | Kumar .................. | H04L 45/125 |
| 2018/0197110 | A1 * | 7/2018 | Rao ........................ | G06F 30/398 |
| 2018/0198682 | A1 * | 7/2018 | Rao ....................... | H04L 41/145 |
| 2018/0198734 | A1 * | 7/2018 | Raponi ................. | H04L 49/109 |
| 2018/0227180 | A1 * | 8/2018 | Rao ......................... | G06F 15/76 |

(Continued)

*Primary Examiner* — Nha T Nguyen

(74) *Attorney, Agent, or Firm* — Dana Legal Services; Jubin Dana

(57) ABSTRACT

An image of a floorplan of an electronic system is accessed. The floorplan shows blockages, free space and connection ports for a Network-on-Chip (NoC). The image is supplied as an input to an AI image generation model that has been trained to add NoC switches at probable positions in the free space of the floorplan in view of the connection ports. An output of the AI image generation model provides a high-level visualization of a NoC architecture.

15 Claims, 7 Drawing Sheets

(56)     References Cited

U.S. PATENT DOCUMENTS

| | | | |
|---|---|---|---|
| 2018/0227215 A1* | 8/2018 | Raponi | H04L 45/38 |
| 2018/0260498 A1* | 9/2018 | Nagaraja | G06F 30/327 |
| 2019/0251227 A1* | 8/2019 | Fink | G06F 30/398 |
| 2019/0260644 A1* | 8/2019 | Rao | H04L 41/12 |
| 2019/0266307 A1* | 8/2019 | Rao | H01L 23/3114 |
| 2021/0029045 A1* | 1/2021 | Prasad | H04L 47/283 |
| 2024/0143883 A1* | 5/2024 | Luo | G06F 30/392 |
| 2024/0284078 A1* | 8/2024 | Chen | H04Q 11/0005 |
| 2025/0028889 A1* | 1/2025 | Mishra | G06F 30/27 |
| 2025/0141779 A1* | 5/2025 | Hew | H04L 45/566 |
| 2025/0252710 A1* | 8/2025 | Aggarwal | G06V 10/764 |

* cited by examiner

FIG. 1

Access an image of a floorplan of an electronic system — 310

Highlight blockages and connection ports in the image — 320

Supply floorplan image to AI image generation model that has been trained to add NoC switches at probable positions in free space of the floorplan in view of the ports — 330

Extract coordinates of the NoC switches — 340

USE OF AI IMAGE GENERATION MODEL TO CREATE HIGH-LEVEL VISUALIZATION OF A NETWORK-ON-CHIP

FIELD

The present technology is in the field of electronic computer aided design of electronic systems, and more specifically, to electronic computer aided design of a network-on-chip.

BACKGROUND

Network-on-chip (NoC) technology is being used at many semiconductor companies to support an ever-increasing number of cores on a single chip and satisfy a demand for ever-increasing processing power and allow communication between Intellectual Property (IP) blocks or elements within a System-on-Chip (SoC). A NoC is superior to old point-to-point connectivity by way of a more scalable communication architecture that makes use of packet transmissions.

During design of a NoC architecture, an initial topology is generated and the initial topology is updated over multiple iterations until certain criteria are satisfied. Generating that initial topology can be challenging, especially for a complex NoC architecture.

SUMMARY

In accordance with various embodiments and aspects herein, a computer-aided design method includes accessing an image of a floorplan of an electronic system, the floorplan showing blockages, free space and connection ports for a Network-on-Chip (NoC); and supplying the image as an input to an AI image generation model that has been trained to add NoC elements, which includes switches (nodes) and routes (edges), at probable positions in the free space of the floorplan in view of the connection ports. An output of the AI image generation model provides a high-level visualization of a NoC architecture.

In accordance with various embodiments and aspects herein, an electronic computer aided design tool includes a non-transitory computer readable medium configured with code, that when executed by one or more processors, causes the tool to access an image of a floorplan of an electronic system, the image showing blockages, free space and connection ports for a Network-on-Chip (NoC); and supply the image as an input to an AI image generation model that has been trained to add NoC switches at probable positions in the free space. An output of the AI image generation model provides a high-level visualization of the NoC.

In accordance with various embodiments and aspects herein, a method of configuring a diffusion model to generate a high-level visualization of a NoC includes forming training data from multiple image pairs. A first image of each pair shows a floorplan, and a second image of each pair shows well-placed switches in free space of the floorplan. The method further includes performing forward diffusion on the first images of the training data, including adding noise to the first images over a plurality of time steps to produce noised first images; and performing reverse diffusion on the noised first images, conditioned on the second images, so the diffusion model learns a distribution relating to the well-placed switches.

BRIEF DESCRIPTION OF THE DRAWINGS

In order to understand the invention more fully, a reference is made to the accompanying drawings. The invention is described in accordance with the aspects and embodiments in the following description with reference to the drawings or figures (FIG.), in which like numbers represent the same or similar elements. Understanding that these drawings are not to be considered limitations in the scope of the invention, the presently described aspects and embodiments and the presently understood best mode of the invention are described with additional detail through the use of the accompanying drawings.

FIG. 1 shows certain features of an electronic system including a NoC.

FIG. 4 shows a highlighted image of a floorplan of an electronic system in accordance with various aspects and embodiments herein.

DETAILED DESCRIPTION

Figure 2:
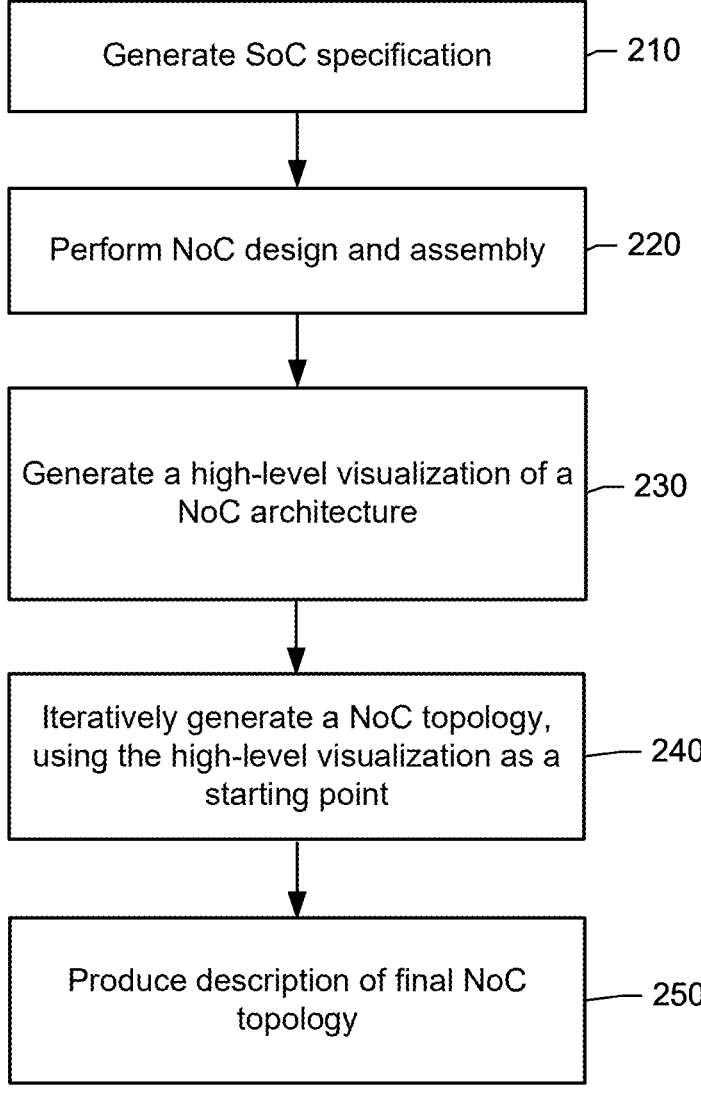
FIG. 2 shows an overview of a NoC design process in accordance with various aspects and embodiments herein.

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. The examples provided are intended as non-limiting examples. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment of the invention.

Thus, appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

Figure 1:
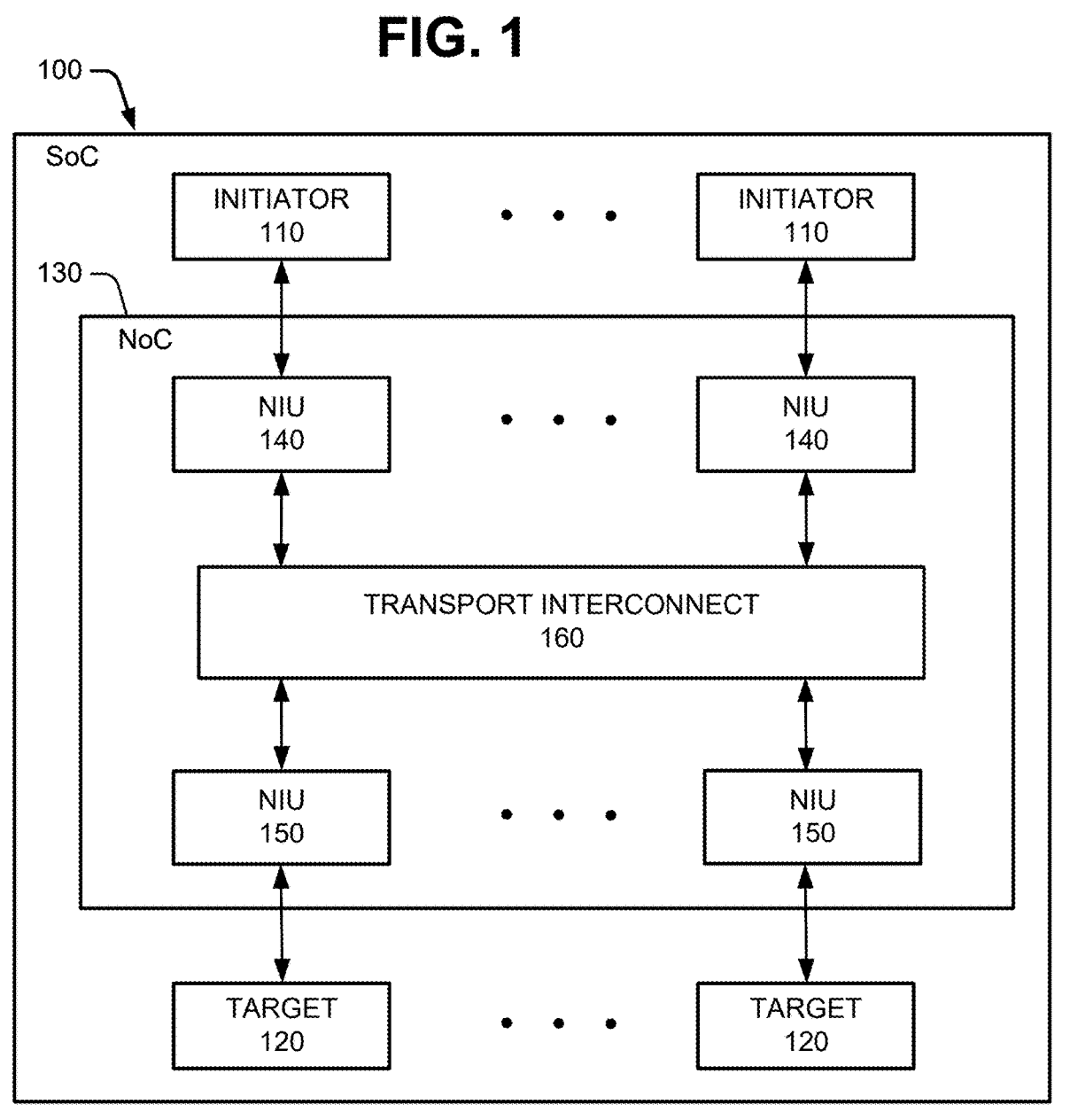

Reference is made to FIG. 1, which illustrates an electronic system. By way of example, the electronic system is a system on chip (SoC) 100. The SoC 100 includes a plurality of initiators 110 and a plurality of targets 120. Some examples of the initiators 110 include central processing units (CPUs), graphics processing units (GPUs), video cards, accelerators, and direct memory access (DMA) controllers. Some examples of the targets 120 include volatile memory, persistent memory, and peripherals.

The SoC 100 further includes a network-on-chip (NoC) 130. The NoC 130 sends request transactions from an initiator 110 to one or more targets 120 using industry-standard protocols. A request transaction may include an address of the target 120. The NoC 130 decodes the address and transports the request transaction. The target 120 handles the request transaction and may send a response transaction, which is transported back to the initiator 110 via the NoC 130.

The NoC 130 includes a plurality of network interface units (NIUs) 140 and 150 and a transport interconnect 160. Those NIUs 140 that interface with the initiators 110 are referred to as initiator NIUs 140, and those NIUs 150 that interface with the targets 120 are referred to as target NIUs 150. Each initiator 110 is coupled to the transport interconnect 160 via a corresponding initiator NIU 140. Each target 120 is coupled to the transport interconnect 160 via a corresponding target NIU 150.

Each NIU 140 or 150 is configured to convert the protocol used by its corresponding initiator 110 or target 120 into a transport protocol used inside the NoC 130. The transport protocol is typically based on the transmission of packets.

The transport interconnect 160 includes switches, adapters, and buffers for transporting packets between the NIUs 140 and 150. Switches may be used to route flows of traffic between source and destinations. Adapters may be used to deal with various conversions between data width, clock and power domains. Buffers may be used to insert pipelining elements to span long distances, or to store packets to deal with rate adaptation between fast senders and slow receivers or vice-versa.

In general, the NoC 130 is highly configurable. Certain NoC components such as the NIUs 140 and 150 and switches may have many different possible configurations. Other NoC components such as buffers may have relatively fewer possible configurations.

Reference is made to FIG. 2, which illustrates a general method of designing a NoC for a SoC. At block 210, a SoC specification is generated. The specification provides a chip definition, technology, domains and layout for the SoC. In accordance with some aspects and embodiments of the invention, the specification also defines the real estate for the NoC and other NoC constraints. The SoC layout may include the locations of initiators and targets. In accordance with some aspects and embodiments of the invention, At block 220, NoC design and assembly are performed. Intellectual property (IP) blocks are selected from a NoC library, and the selected IP blocks are instantiated. In accordance with some aspects and embodiments of the invention, for the NIUs, parameters such as bandwidth and clock frequency are selected; switches are not yet configured.

In addition, IP connection and assembly, sockets configuration, and end-to-performance capture may be performed. This stage produces a NoC specification that defines SoC IP blocks and their related sockets and protocols, along with the communication flows between initiators and targets, and memory maps.

In accordance with some aspects and embodiments of the invention, an architecture configuration of the NoC is generated. At block 230, a high-level visualization of a NoC architecture is automatically generated in accordance with some aspects and embodiments of the invention. The high-level visualization shows positions of switches at probable locations in the free area of a floorplan, but does not show electrical connections. These switches will hereinafter be referred to as "proposed" switches.

At block 240, a NoC topology is iteratively generated in accordance with some aspects and embodiments of the invention, As used herein, a NoC topology refers to a general layout of NoC components (e.g., network interface units, buffers, switches, firewalls, and adapters) and electrical connections between the NoC components, as well as connections between the IP blocks of the SoC and the connection ports for the NoC.

The high-level visualization may be used as a starting point for creating a first iteration of the NoC topology. Creating the initial iteration may include searching for the best routing between sources and targets using the switches at the probable locations in the free space. In some embodiments, electrical connections are made between some or all of the proposed switches to connect each initiator NIU to its set of target NIUs. In other embodiments, the proposed switches are considered as candidates. The proposed switches may or may not be used to make connections, and their positions may be modified.

In still other embodiments, the proposed switches may be supplied as candidates to an algorithm that automatically makes connections from each initiator NIU to its set of target NIUs. Two such algorithms are described in assignee's U.S. application Ser. No. 19/095,082 filed Mar. 31, 2025 and titled "Incremental Topology Synthesis for a Network-on-Chip," which is incorporated herein by reference. Those two algorithms decide positions for switches. The proposed switches in the high-level visualization may be provided as good candidates to be chosen by those algorithms.

Multiple iterations of the NoC topology may be generated In the iterations, configurations of existing NoC elements are modified. Switches, buffers, firewalls, pipelines and rate adapters may be added to the NoC topology. Parameters for the NIUs are not modified. The switches may be re-configured according to the NIUs to which they are connected. Connectivity schemes (e.g., from a mesh to crossbar or modified mesh) may be changed. Safety through unit duplication may be implemented. Power, Performance and Area (PPA) tradeoffs may be performed.

In accordance with some aspects and embodiments of the invention, a NoC design may have to satisfy different performance requirements, such as connectivity and latency between source and destination, frequency of various elements, maximum area available for NoC logic and its associated routing (wiring), minimum throughput between sources and destinations, power consumption requirements, and position on the floorplan. The iterations of the NoC topology continue until the different performance requirements are satisfied.

At block 250, a final NoC topology description is produced, for instance, in a computer-readable file or done through a user interface, in graphical or textual form. The description may be stored in computer memory, ready for use by software. The description may then be sent to an SoC integrator for subsequent steps of building the SoC that includes the NoC.

Creating the high-level visualization and using it as a starting point for NoC topology generation offers several advantages. In accordance with some aspects and embodiments of the invention, a starting point is automatically generated. Otherwise, generating a starting point can sometimes be elusive, especially as the level of SoC integration continues to grow, and the NoC architecture becomes more complex. Moreover, the high-level visualization provides early information on NoC architecture. It provides designers with a better understanding of the project at hand, and saves time in proposing a NoC topology that is more efficient in terms of occupancy area, wirelength, etc. This is particularly useful for big and complex SoC designs. The high-level visualization also helps to generate a NoC topology with fewer iterations. Thus, the high-level visualization can improve computational efficiency of generating a NoC topology.

In accordance with some aspects and embodiments of the invention, the high-level visualization improves performance efficiency of a NoC. As will be discussed below, the high-level visualization is generated by a machine learning model that is trained on data specific to NoC generation, In accordance with some aspects and embodiments of the invention. As more training data is accumulated, and the model is retrained, it will produce a high-level visualization that gives a better solution in terms of performance (e.g., saving wire length, and reducing area).

Figure 3:
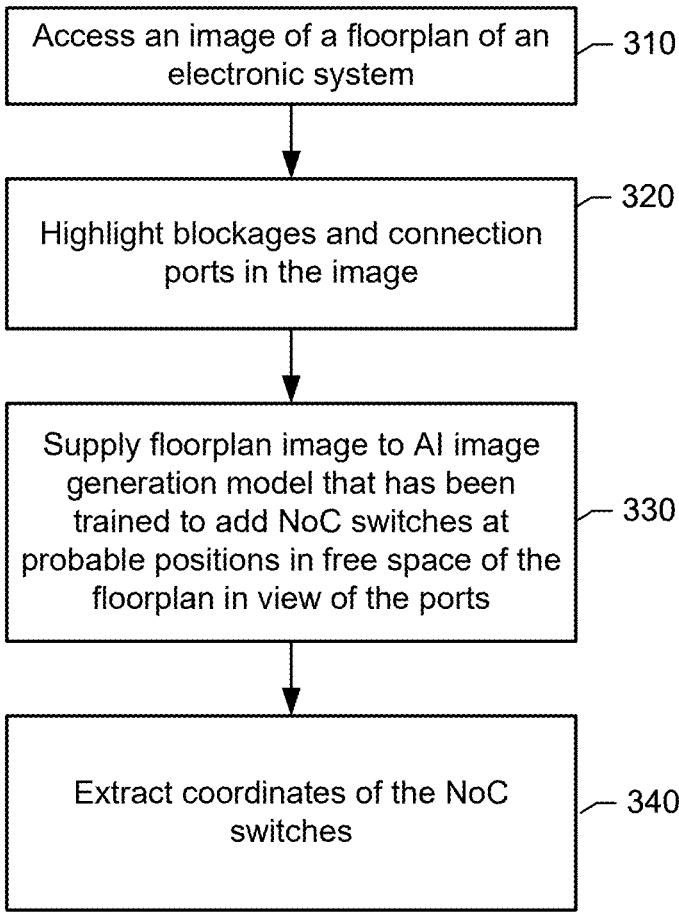
FIG. 3 shows a method of automatically generating a high-level visualization of a NoC architecture in accordance with various aspects and embodiments herein.

Reference is made to FIG. 3, which illustrates a method of generating a high-level visualization of a NoC architecture. At block 310, an image of a floorplan of an electronic system is accessed. As used herein, a floorplan of an electronic system refers to a schematic representation of tentative placement of major functional blocks (such as IP blocks or elements) of the electronic system. These tentative locations are identified by the architect of the electronic system. The floorplan identifies blockages. The floorplan also identifies free space, in which a NoC may be located.

In accordance with some aspects and embodiments of the invention, the floorplan also shows connection ports for a NoC. The major functional blocks will be connected to the NoC via the connection ports. As used herein, a connection port may refer to one or more connection ports of a NIU, or it may refer to the NIU itself, or it may refer to a socket for that NIU. Typically, an NIU is at the position of, or very close to, the position of its connection port(s).

At block 320, blockages and connection ports in the image are highlighted. In some embodiments, the blockages and connection ports may be color-coded. The highlighting at block 320 may be performed by a deterministic algorithm.

Figure 4:
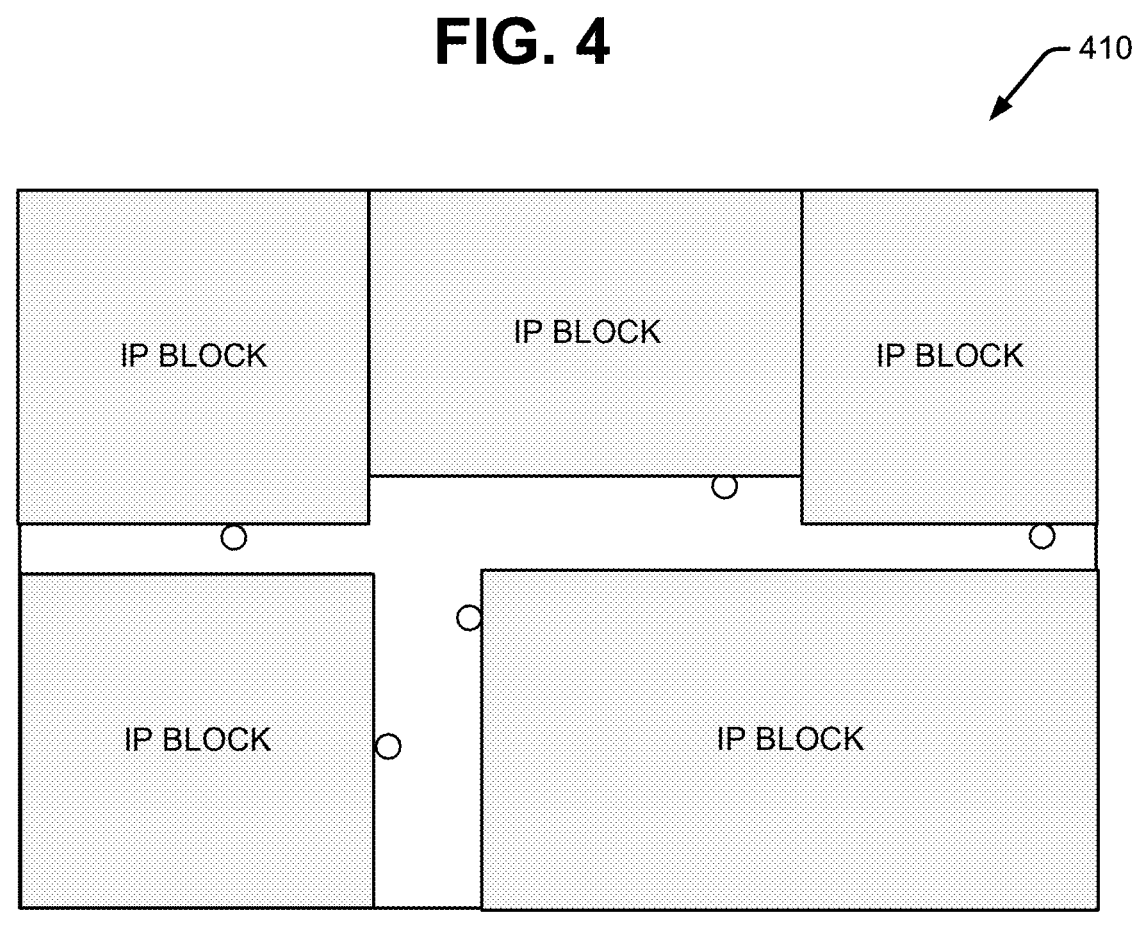

FIG. 4 shows a grayscale image of a highlighted floorplan 410 produced by the processing of block 320. Blockages are formed by IP blocks of the electronic system. The blockages are shaded in gray, and the ports are shown as open circles. In a color image, in contrast, the connection ports may be shown in different colors, such as blue for the initiator ports and red for the target ports. The free space is shown in white.

At block 330, the image of the highlighted floorplan is provided as an input to a trained AI image generation model. The AI image generation model has been trained to add NoC switches at probable positions in the free space of the floorplan in view of the connection ports. The AI image generation model generates an output image having switches at probable positions in the free space. The output image provides a high-level visualization of a NoC architecture.

The NoC switches may also be color-coded in the output image. For example, the NoC switches may be colored green.

The high-level visualization is free of wire connections between the switches. The wires connections tend to make the output image too cluttered so as to reduce the effectiveness of the high-level visualization.

Figure 5:
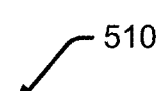
FIG. 5 shows the floorplan of FIG. 4 plus a high-level visualization of a NoC architecture in accordance with various aspects and embodiments herein.
Figure 5:
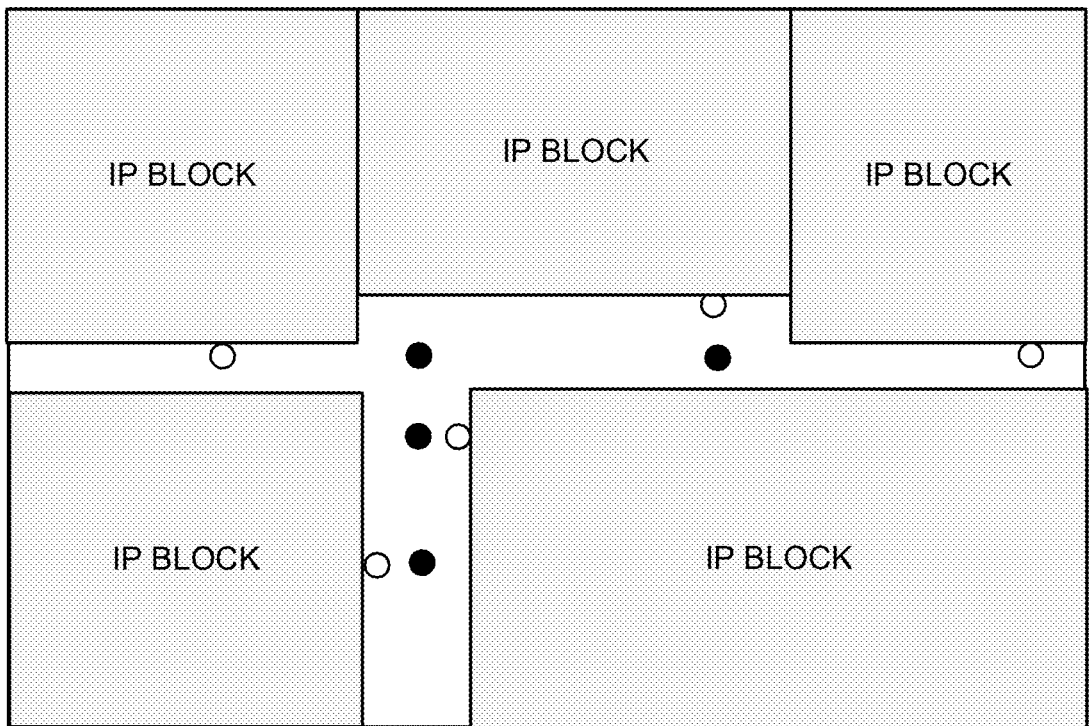

FIG. 5 shows an output image of a floorplan 510 in which switches have been added to the free space. Since FIG. 5 is a grayscale image, the added switches are shown as filled circles. In a color image, the switches may be colored green or another color. The high-level visualization of FIG. 5 is not cluttered with wire connections.

In some embodiments, the AI image generation model may have been trained to add other NoC elements. For instance, the AI image generation model may have been further trained to add NoC adapters to the free space. As a result, the AI image generation model may add NoC adapters to the free space. Examples of NoC adapters include, but are not limited to, buffers and clock adapters.

The AI image generation model is not limited to any particular type. Examples, include, but are not limited to, a diffusion model and a generative adversarial network (GAN) model. A stable diffusion model will be described below. For the purpose herein, the GAN model includes a generator neural network that generates new candidate images, and a discriminator neural network that distinguishes the candidate images from a true data distribution. Given a training set, the GAN model learns to generate images of NoC switches at probable positions in free space with the same statistics as the training set. The generator neural network is trained on whether it succeeds in fooling the discriminator neural network.

At block 340, coordinates of the switches are extracted from the high-level visualization, and a list of coordinates is generated. The coordinates for a given switch may be at the center of the circle representing the given switch. The list of coordinates will be used as a starting point to generate a first iteration of a NoC topology.

In some embodiments, the AI image generation model may be combined with other models, such as text-encoders and cross-attention modules to enable text-conditioned generation. This enables text to be supplied as an input to the AI image generation model along with a floorplan image. Examples of what the text can do, include without limitation any or all of the following: describe what the floorplan represents; describe a color code convention for the blockages, connection ports, free space, and switches; identify all destinations to which each source will be connected; and specify bandwidth and pipelining.

Figure 6:
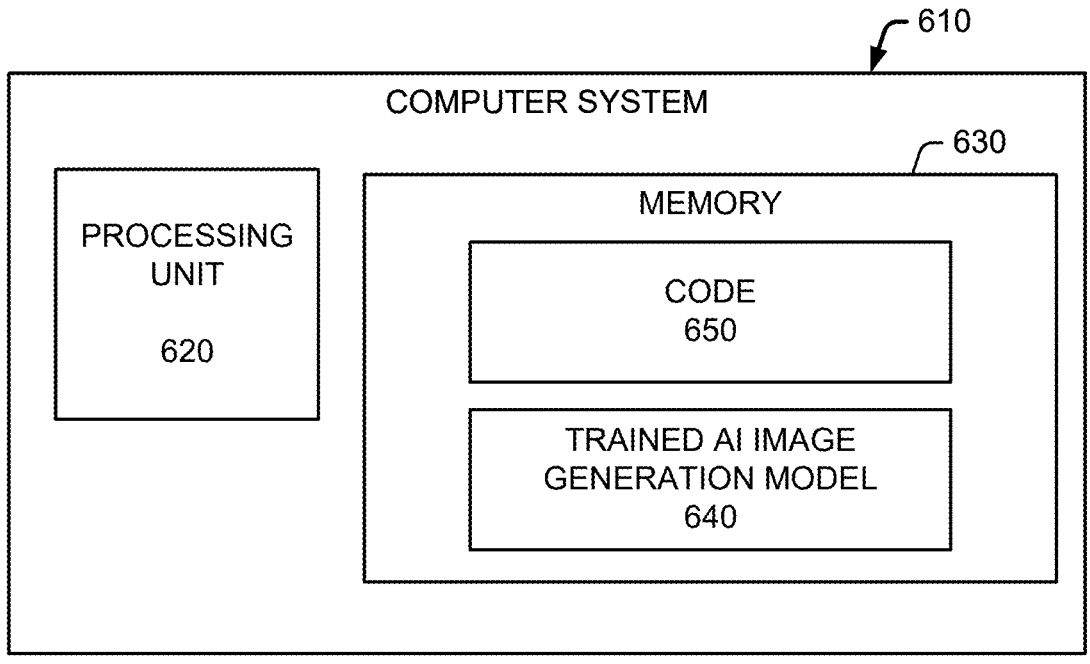
FIG. 6 shows a computer system including memory configured with code and an AI image generation model in accordance with various aspects and embodiments herein.

FIG. 6 shows a computer system 610 including a processing unit 620 and computer-readable memory 630 encoded with a trained AI image generation model 640 and code 650 that, when executed, causes the computer system 610 to generate a high-level visualization of a NOC architecture in accordance with a method herein. In the embodiment shown in FIG. 6, the trained AI image generation model 640 resides in the computer system 610. In other embodiments, the trained AI image generation model 640 may be at a remote location that is accessible to the computer system 610.

Training of the AI image generation model will now be described. The training enables the AI image generation model to learn visual patterns present in existing NoC topologies in which the switches are well placed.

The training will be described for a diffusion model. A diffusion model is a type of neural network that is trained with the objective of removing successive applications of Gaussian noise in training images. The goal of the training is to learn a diffusion process for given dataset, such that the process can generate new elements that are distributed similarly as the given dataset.

Training of a diffusion model involves a forward diffusion process and a reverse diffusion process. During forward diffusion, an image is progressively noised according to a variance schedule. During reverse diffusion, a noised image is transformed back into a sample image from the target distribution.

Figure 7:
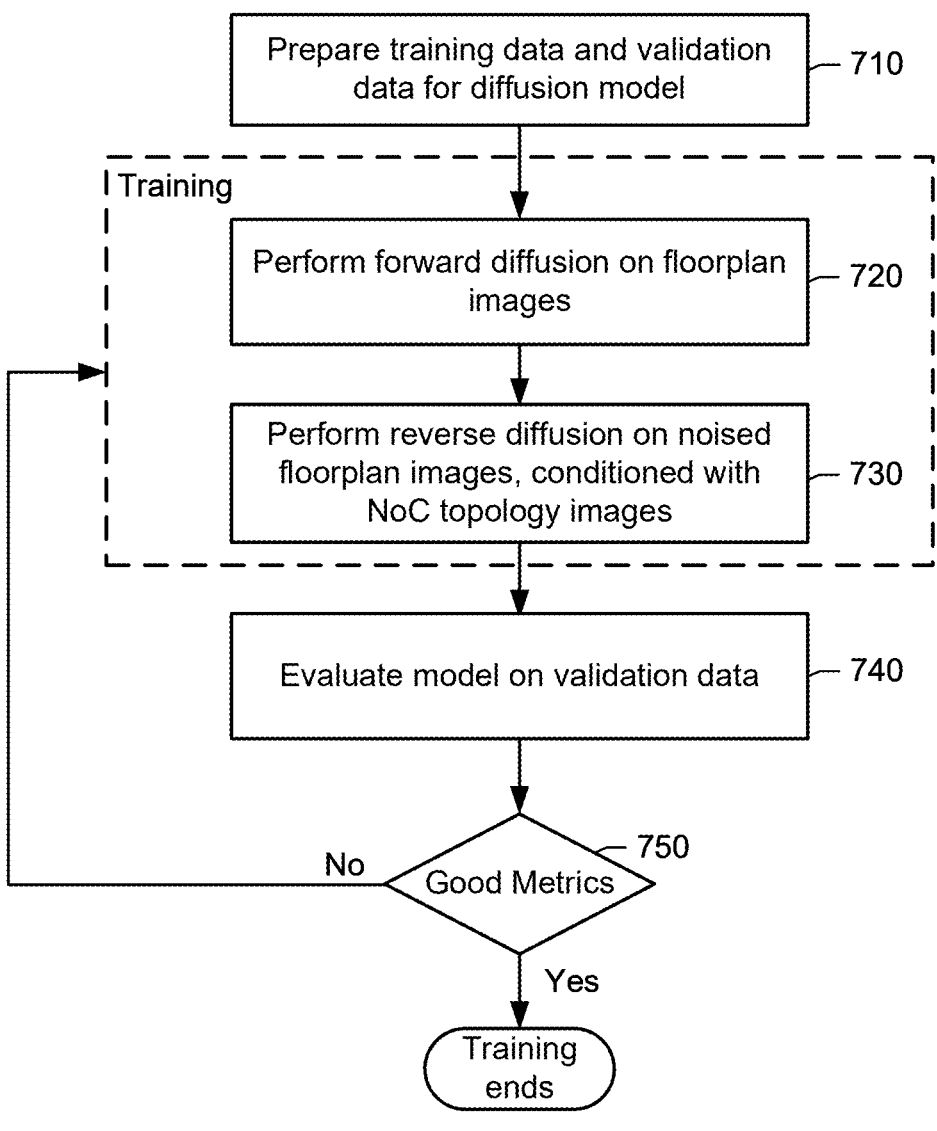
FIG. 7 shows a method of training a diffusion model to produce a high-level visualization of a NoC architecture in accordance with various aspects and embodiments herein.

Reference is now made to FIG. 7, which illustrates a method of conditioned training of a diffusion model to generate a high-level visualization of a NoC architecture. At block 710, training data and validation data are prepared. Many image pairs are accessed. Each image pair includes a floorplan image and a NoC topology image. For each pair, the floorplan image shows blockages, connection ports, and free space that does not contain any switches, and the NoC topology image shows the blockages and connection ports of the paired floorplan, as well a well-designed placement of switches without wire connections. Some of the image pairs may be set aside for validation data, while the remainder of the image pairs may be used for training data.

The training data may be historical, synthesized, or a combination of both historical and synthesized data. Historical data may be taken from real electronic systems that have been identified as having well-designed NoC topologies. Data may be synthesized, for example, by generating a random floorplan and using an algorithm to produce a well-defined topology.

At block 720, the training begins with forward diffusion. Gaussian noise is added to each floorplan image at time steps $t_0 \ldots t_N$ according to a variance schedule. Noise is added to an entire floorplan image, not just the free space, because the model is not aware of the free space. The forward diffusion yields a time series of increasing noise for each floorplan image of the training set. Noise is not added to the NoC topology images.

At block 730, reverse diffusion is performed. Weights of the diffusion model are adjusted to remove noise from the noised floorplan images in such a way to fit the NoC topology in the paired NoC topology images. In this manner, the NoC topology images are used to condition the denoising such that the diffusion model learns a distribution relating to well-placed switches. The NoC topology images may be used at only the last time step, or they may be used at multiple time steps.

At block 740, the trained diffusion model is evaluated on the validation data. The evaluating may include generating metrics.

At block 750, if the metrics are good, the training ends. If not, training continues, and control is returned to block 720.

Certain methods, which can be implemented in a product or an electronic computer-aided design (ECAD) tool, according to the various aspects of the invention may be performed by instructions that are stored upon a non-transitory computer readable medium. The non-transitory computer readable medium stores code including instructions that, if executed by one or more processors, would cause a system or computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments shown and described herein. Rather, the scope and spirit of present invention is embodied by the appended claims.

What is claimed is:

1. A computer-aided design method comprising:

accessing an image, which is at least one of: black and white image, a grayscale image, and a color image, of a floorplan of an electronic system, the floorplan including:

blockages;

free space; and connection ports for a Network-on-Chip (NoC); and supplying the image as an input to an AI image generation model that has been trained to add NoC switches at probable positions in the free space of the image in view of the connection ports, wherein an output of the AI image generation model provides a high-level visualization of a NoC architecture including placement of switches in the free space identified in the image and free of wire connections between the NoC switches.

2. The computer-aided design method of claim 1, wherein the AI image generation model is further trained to color-code the NoC switches.

3. The computer-aided design method of claim 1, further comprising color-coding the blockages and the connection ports in the image prior.

4. The computer-aided design method of claim 1, wherein the AI image generation model has been further trained to add NoC adapters to the free space; and wherein the high-level visualization also includes NoC adapters in the free space.

5. The computer-aided design method of claim 1, wherein the AI image generation model is a stable diffusion model.

6. The computer-aided design method of claim 1, further comprising extracting coordinates of the NoC switches in the high-level visualization; and creating a list of the coordinates.

7. The computer-aided design method of claim 1, further comprising supplying text description of the floorplan to the AI image generation model.

8. The computer-aided design method of claim 1, further comprising iteratively generating a topology of the NoC, using the high-level visualization as a starting point.

9. The computer-aided design method of claim 8, wherein iteratively generating the topology of the NoC includes creating an initial iteration, wherein creating the initial iteration includes searching for a routing between the connection ports in the NoC architecture using the NoC switches at probable locations in the free space.

10. The computer-aided design method of claim 9, wherein the searching is performed by an algorithm that uses the NoC switches at the probable locations as candidates.

11. The computer-aided design method of claim 1, wherein the AI image generation model was trained with images of switches in well designed NoC topologies.

12. An electronic computer aided design (ECAD) tool comprising a non-transitory computer readable medium encoded with code, that when executed by one or more processors, causes the ECAD tool to:

access an image of a floorplan of an electronic system, wherein the image is at least one of black and white image, a greyscale image, and a color image and wherein the image including at least one or more of:

blockages;

free space; and connection ports for a Network-on-Chip (NoC); and supply the image as an input to an AI image generation model that has been trained to add NoC switches, which are represented visually in the image of the floorplan, at probable positions in the free space while avoiding position within the blockages, wherein an output of an AI image generation model provides a high-level visualization of the NoC and the output includes placement of switches in free space located in the image and free of wire connections between the NOC switches.

13. The ECAD tool of claim 12, wherein the code, when executed, further causes the ECAD tool to extract coordinates of the NoC switches in the high-level visualization; and create a list of the coordinates.

14. The ECAD tool of claim 12, wherein the AI image generation model is a stable diffusion model.

15. The ECAD tool of claim 12, wherein the code, when executed, further causes the ECAD tool to iteratively generate a topology of the NoC, using the high-level visualization as a starting point.

* * * * *